(12) United States Patent
Jeon

(10) Patent No.: US 10,749,220 B2
(45) Date of Patent: Aug. 18, 2020

(54) BATTERY CONTROL APPARATUS AND BATTERY CONTROL SYSTEM

(71) Applicant: SAMSUNG ELECTRONICS CO., LTD., Suwon-si (KR)

(72) Inventor: Jinyong Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 888 days.

(21) Appl. No.: 15/399,018

(22) Filed: Jan. 5, 2017

(65) Prior Publication Data

US 2017/0194673 A1    Jul. 6, 2017

(30) Foreign Application Priority Data

Jan. 5, 2016 (KR) .................. 10-2016-0000841

(51) Int. Cl.
*H01M 10/42* (2006.01)
*H01M 10/48* (2006.01)
*H04Q 9/00* (2006.01)

(52) U.S. Cl.
CPC ......... *H01M 10/48* (2013.01); *H01M 10/425* (2013.01); *H04Q 9/00* (2013.01); *H01M 2010/4278* (2013.01); *H01M 2220/20* (2013.01); *H04Q 2209/10* (2013.01); *H04Q 2209/30* (2013.01)

(58) Field of Classification Search
CPC .............. H01M 10/48; H01M 10/425; H01M 2010/4278; H02J 7/0021
USPC .......................... 320/107, 128, 132, 140, 150
See application file for complete search history.

(56) References Cited

U.S. PATENT DOCUMENTS

| | | | |
|---|---|---|---|
| 8,115,446 B2 | 2/2012 | Piccard et al. | |
| 8,779,722 B2 | 7/2014 | Lee et al. | |
| 8,884,580 B2 | 11/2014 | Roeper | |
| 9,046,585 B2 | 6/2015 | Sugeno et al. | |
| 2009/0152953 A1 | 6/2009 | Dong et al. | |
| 2010/0117593 A1 | 5/2010 | Piccard et al. | |
| 2012/0327596 A1* | 12/2012 | Anderson-Straley | ........................ H01M 10/625 361/689 |

(Continued)

FOREIGN PATENT DOCUMENTS

| | | |
|---|---|---|
| EP | 2 806 525 A2 | 11/2014 |
| JP | 4995005 B2 | 8/2012 |

(Continued)

OTHER PUBLICATIONS

Extended European Search Report dated May 31, 2017 in corresponding European Application No. 16207276.3 (7 pages in English).

*Primary Examiner* — Edward Tso
*Assistant Examiner* — Aaron Piggush
(74) *Attorney, Agent, or Firm* — NSIP Law

(57) ABSTRACT

A slave control apparatus including a receiver and a controller. The receiver is configured to receive a sensed physical quantity of a battery and a sensed output physical quantity of a converter corresponding to the battery. The controller is configured to determine state information of the battery based on the sensed physical quantity and the sensed output physical quantity, transmit the state information to a master control apparatus, and control the converter based on output information from the master control apparatus that corresponds to the state information.

21 Claims, 10 Drawing Sheets

(56) References Cited

U.S. PATENT DOCUMENTS

| | | | |
|---|---|---|---|
| 2013/0162199 A1* | 6/2013 | Takahashi | H01M 10/44 320/107 |
| 2013/0335096 A1 | 12/2013 | Hasenkopf et al. | |
| 2014/0084867 A1 | 3/2014 | Hamaoka et al. | |
| 2014/0097787 A1* | 4/2014 | Lin | H02J 7/0018 320/103 |
| 2015/0084598 A1* | 3/2015 | Song | H02J 7/0021 320/128 |
| 2016/0118830 A1 | 4/2016 | Jeon et al. | |
| 2016/0311328 A1 | 10/2016 | Kim et al. | |

FOREIGN PATENT DOCUMENTS

| | | |
|---|---|---|
| JP | 5035978 B2 | 9/2012 |
| JP | 5100141 B2 | 12/2012 |
| JP | 5740899 B2 | 7/2015 |
| KR | 10-1122598 B1 | 3/2012 |

\* cited by examiner

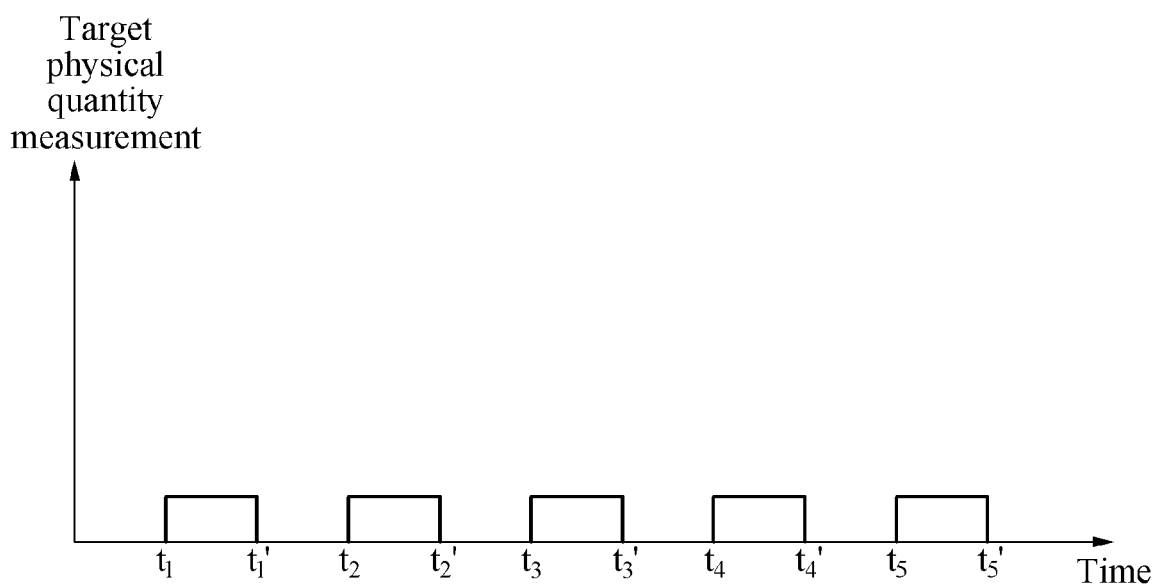

FIG. 4A
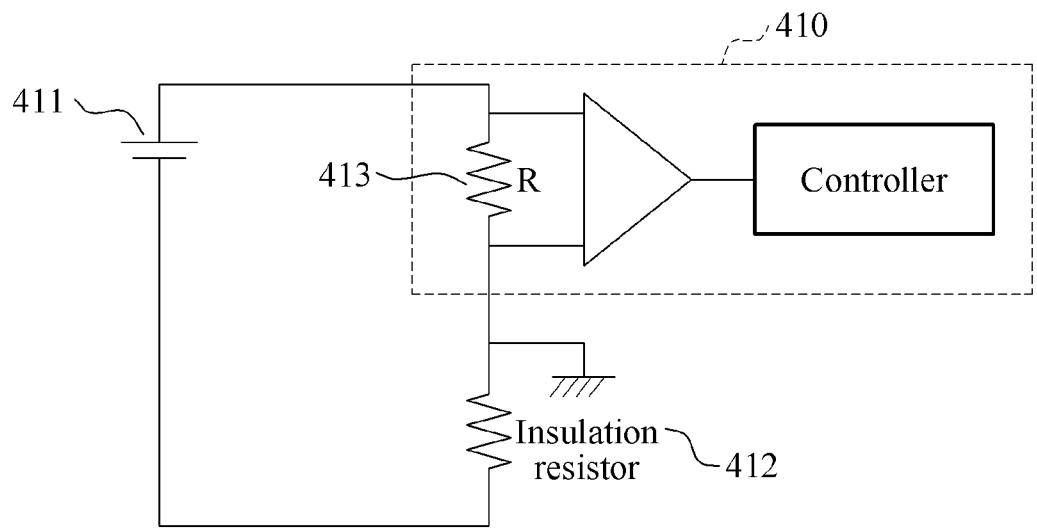
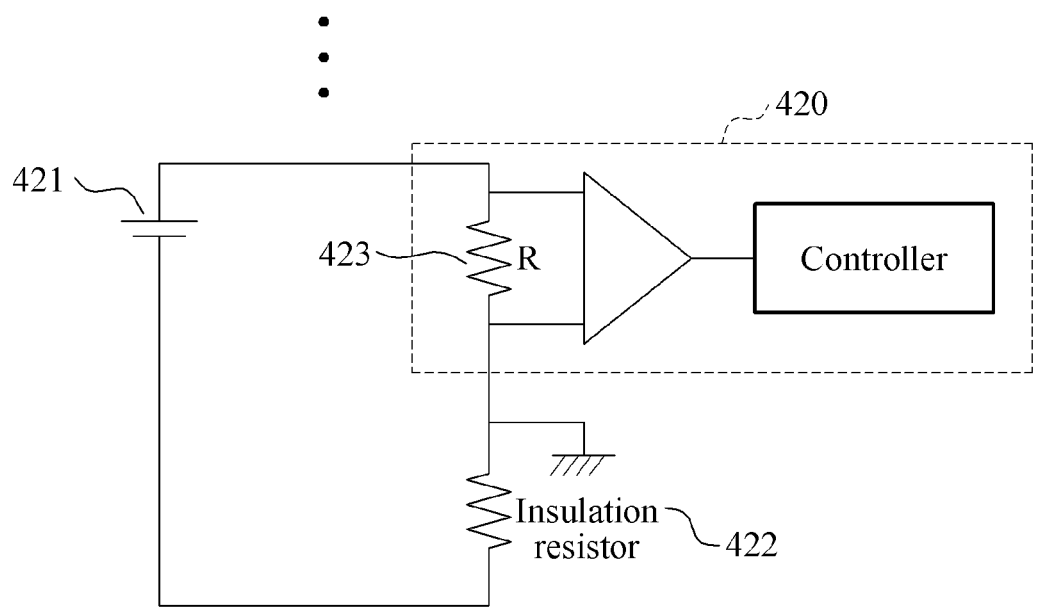

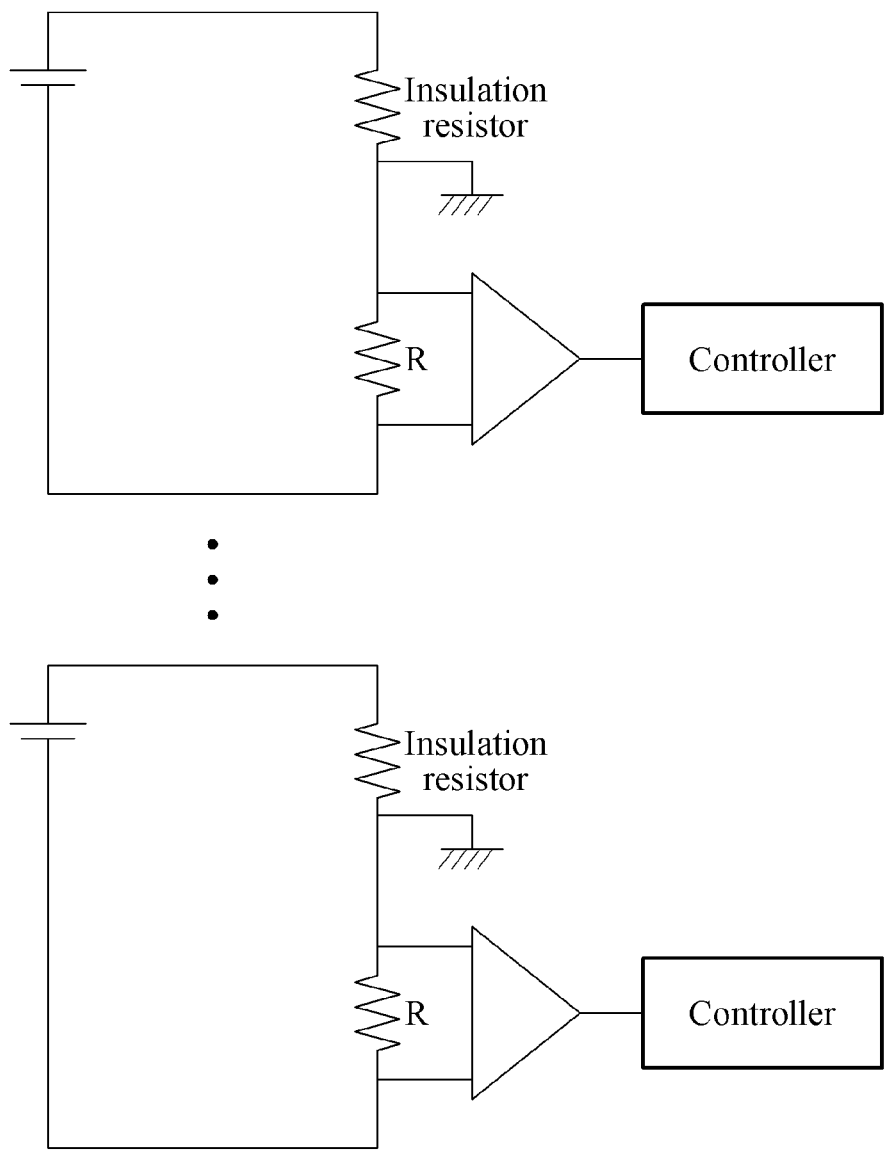

BATTERY CONTROL APPARATUS AND BATTERY CONTROL SYSTEM

CROSS-REFERENCE TO RELATED APPLICATION(S)

This application claims the benefit under 35 USC 119(a) of Korean Patent Application No. 10-2016-0000841, filed on Jan. 5, 2016, in the Korean Intellectual Property Office, the entire disclosure of which is incorporated herein by reference for all purposes.

BACKGROUND

1. Field

The following description relates to a battery control apparatus and a battery control system.

2. Description of Related Art

A multi-slave system includes a master control apparatus and a plurality of slave control apparatuses. The multi-slave system may be used in various fields. For example, in an energy storing system, the multi-slave system is used in a battery pack including a plurality of batteries connected in series or in parallel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a slave control apparatus, including: a receiver configured to receive a sensed physical quantity of a battery and a sensed output physical quantity of a converter corresponding to the battery; and a controller configured to determine state information of the battery based on the sensed physical quantity and the sensed output physical quantity, transmit the state information to a master control apparatus, and control the converter based on output information from the master control apparatus that corresponds to the state information.

A sensing point in time of the sensed physical quantity may correspond to a sensing point in time of the sensed output physical quantity.

The receiver may be configured to perform calculation using a first value of a first current sensed at a first sensing point in time and a second value of a second current sensed at the first sensing point in time, the first current may correspond to a current flowing between a high voltage load and the battery, and the second current may correspond to an output current from the converter to a low voltage load.

The controller may be configured to determine the state information based on at least one of a result of the performing of the calculation, a sensed thermal physical quantity of the battery, and a sensed electrical physical quantity of the battery.

The output information may correspond to the state information based on a required physical quantity of a low voltage load.

Pack state information of a battery pack, which includes the battery and another battery, may be based on the state information of the battery and state information of the other battery.

The controller may be configured to control a temperature of the battery based on the sensed physical quantity of the battery.

The controller may be configured to sense a leakage current of the battery based on a variance in a resistance of an insulation resistor corresponding to the battery.

In accordance with an embodiment, there is provided a battery control system, including: slave control apparatuses corresponding to batteries, respectively; and a master control apparatus configured to control the slave control apparatuses, wherein each of the slave control apparatuses is configured to receive a sensed physical quantity of a corresponding battery and a sensed output physical quantity of a converter corresponding to the corresponding battery, determine state information of the corresponding battery based on the sensed physical quantity and the sensed output physical quantity, transmit the state information to the master control apparatus, and control the converter based on output information from the master control apparatus that corresponds to the state information.

A sensing point in time of the sensed physical quantity may correspond to a sensing point in time of the sensed output physical quantity.

Each of the slave control apparatuses may be configured to perform calculation using a first value of a first current sensed at a first sensing point in time and a second value of a second current sensed at the first sensing point in time, the first current corresponds to a current flowing between a high voltage load and the corresponding battery, and the second current corresponds to an output current from the converter to a low voltage load.

Each of the slave control apparatuses may be configured to determine the state information based on at least one of the performing of the calculation, a sensed thermal physical quantity of the corresponding battery, and a sensed electrical physical quantity of the corresponding battery.

The master control apparatus may be configured to determine the output information to correspond to the state information based on a required physical quantity of a low voltage load.

The master control apparatus may be configured to determine pack state information of a battery pack including the batteries based on the state information of the corresponding battery transmitted by each of the slave control apparatuses.

Each of the slave control apparatuses may be configured to control a temperature of the corresponding battery based on the sensed physical quantity of the corresponding battery.

Each of the slave control apparatuses may be configured to sense a leakage current of the corresponding battery based on a variance in a resistance of an insulation resistor of the corresponding battery.

In accordance with a further embodiment, there is provided an operating method of a slave control apparatus, the method including: receiving a sensed physical quantity of a battery and a sensed output physical quantity of a converter; determining state information of the battery based on the sensed physical quantity and the sensed output physical quantity; transmitting the state information to a master control apparatus; receiving output information corresponding to the state information from the master control apparatus; and controlling the converter based on the output information.

A sensing point in time of the sensed physical quantity may correspond to a sensing point in time of the sensed output physical quantity.

The receiving may include performing calculation using a first value of a first current sensed at a first sensing point in time and a second value of a second current sensed at the first sensing point in time, the first current corresponds to a current flowing between a high voltage load and the battery, and the second current corresponds to an output current of the converter, the current output to a low voltage load.

The determining may include determining the state information based on at least one of a result of performing the calculation, a sensed thermal physical quantity of the battery, and a sensed electrical physical quantity of the battery.

In accordance with another embodiment, there is provided a slave control apparatus, including: a sensor configured to sense a physical quantity of a battery, wherein the physical quantity of the battery includes at least one of a voltage, a charging current into the battery, a discharging current flowing from the battery to a high voltage load, an impedance, and a temperature; a receiver configured to receive the physical quantity of the battery and an output physical quantity of a converter, wherein the output physical quantity of the converter includes at least one of an output voltage to a low voltage load, an output current to the low voltage load, and an output power to the low voltage load; and a controller configured to determine state information of the battery based on the physical quantity of the battery and the output physical quantity of the converter, wherein the physical quantity of the battery and the output physical quantity of the converter are sensed at a synchronized point in time.

The state information of the battery may include at least one of a state of charge (SOC), a state of health (SOH), and a capacity of the battery.

In response to the state information of the battery being determined, the controller may transmit the state information of the battery to a master control apparatus.

The controller may be further configured to control the temperature of the battery based on the physical quantity of the battery, where, in response to the temperature of the battery being higher than a reference temperature, the controller cools the battery and, in response to the temperature of the battery being lower than the reference temperature, the controller heats the battery.

Other features and aspects will be apparent from the following detailed description, the drawings, and the claims.

BRIEF DESCRIPTION OF THE DRAWINGS

FIGS. 3A and 3B illustrate an example of an operation of the slave control apparatus, in accordance with an embodiment.

FIGS. 4A and 4B are circuit diagrams illustrating an example of sensing a leakage current using the slave control apparatus, in accordance with an embodiment.

Figure 1:
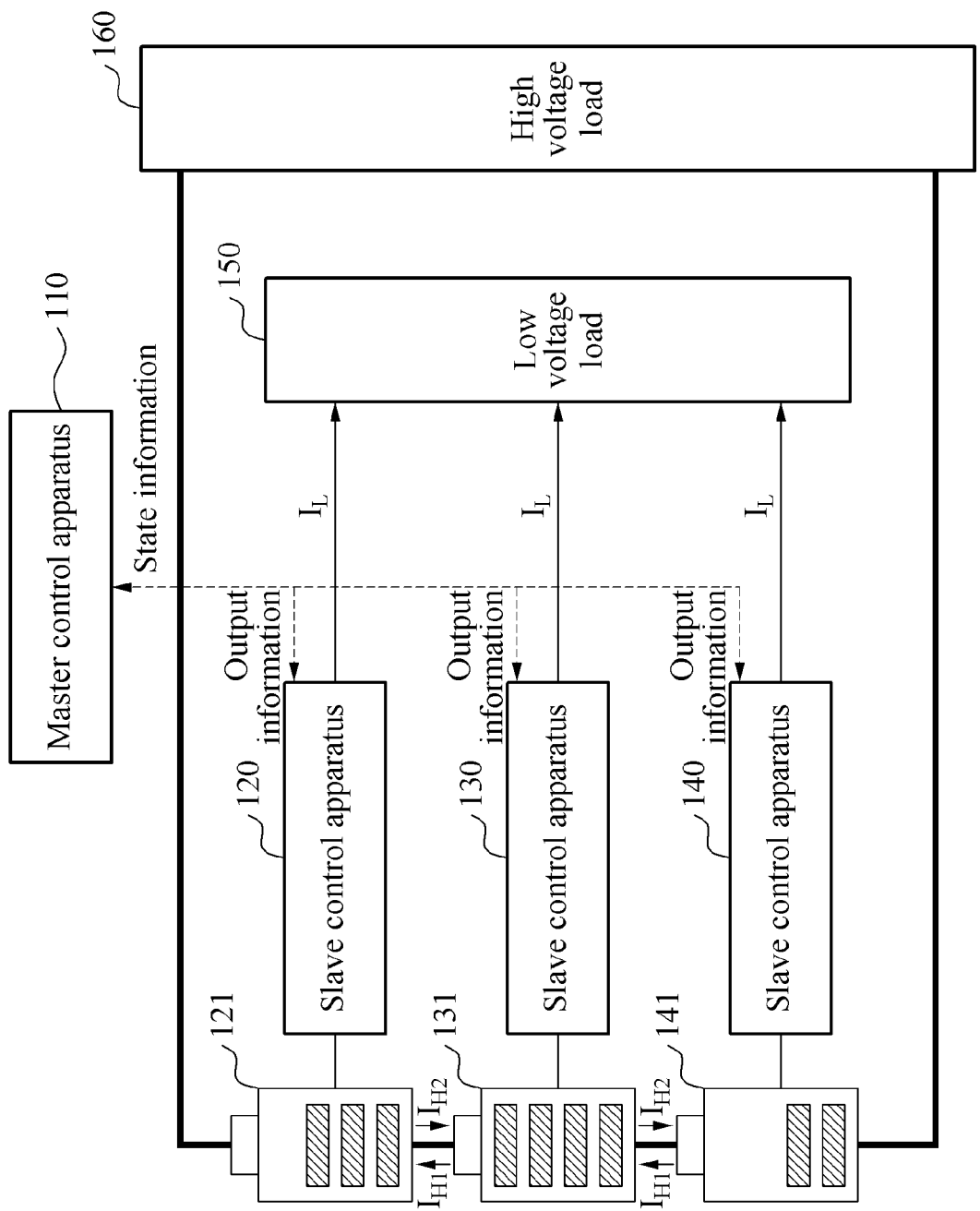
FIG. 1 is a diagram illustrating an example of a battery system, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a diagram illustrating an example of a battery system, in accordance with an embodiment.

Referring to FIG. 1, a battery system includes a battery pack, and a battery control system. The battery pack includes a plurality of batteries 121, 131, and 141. Each of the plurality of batteries 121, 131, and 141 may be a battery cell or a battery module.

The battery control system includes a master control apparatus 110, and a plurality of slave control apparatuses 120, 130, and 140. The plurality of slave control apparatuses 120, 130, and 140 are configured to correspond to the plurality of batteries 121, 131, and 141, respectively. Although not shown in FIG. 1, the battery control system includes converters corresponding to the plurality of batteries 121, 131, and 141, respectively. In an example, at least one converter is included in each of the plurality of slave control apparatuses 120, 130, and 140, respectively.

Hereinafter, descriptions will be provided based on the slave control apparatus 120. The following descriptions may also be applicable to the other slave control apparatuses 130 and 140.

The slave control apparatus 120 receives a sensed physical quantity of the battery 121. The physical quantity of the battery 121 includes one of a voltage, a current, an impedance, and a temperature or a combination thereof. The battery control system includes at least one sensor configured to sense the physical quantity of the battery 121. Although not shown in FIG. 1, the battery control system includes a first current sensor corresponding to the battery 121. The first current sensor corresponding to the battery 121 senses a current flowing between the battery 121 and a high voltage load 160. The high voltage load 160 includes, for example, a charger such as an on-board charger, an inverter, and/or a motor of an electric moving body. The first current sensor senses a current $I_{H1}$ supplied from the battery 121 to the high voltage load 160. In this example, the battery 121 discharges the current $I_{H1}$, and the first current sensor senses the discharging current $I_{H1}$ of the battery 121. Further, the first current sensor senses a current $I_{H2}$ flowing into the battery 121. The battery 121 is charged with the current $I_{H2}$, which is supplied from the charger, and the first current sensor senses such charging current $I_{H2}$. The slave control apparatus 120 receives discharging current data and/or charging current data of the battery 121 from the first current sensor. Further, the battery control system includes a voltage sensor and/or a temperature sensor corresponding to the battery 121. The voltage sensor senses a voltage of the battery 121, and the slave control apparatus 120 receives voltage data of the battery 121 from the voltage sensor. The temperature sensor senses a thermal physical quantity, for example, a temperature, of the battery 121, and the slave control apparatus 120 receives thermal physical quantity data of the battery 121 from the temperature sensor.

In an example, at least one of the first current sensor, the voltage sensor, and the temperature sensor corresponding to the battery 121 is included as a cell monitor in the slave control apparatus 120.

Although not shown in FIG. 1, the battery control system includes first current sensors corresponding to the other batteries 131 and 141, respectively. Each of the first current sensors senses a current $I_{H1}$ or a current $I_{H2}$ flowing between a corresponding battery and the high voltage load 160.

The slave control apparatus 120 receives a sensed output physical quantity of the converter corresponding to the battery 121. A low voltage load 150 includes a system operable at a low voltage, for example, 12 volts (V). The system includes, but is not limited to, a pose control system or a temperature control system of an electric moving body. The output physical quantity of the converter is a physical quantity supplied to the low voltage load 150. The output physical quantity of the converter includes, for example, one of an output voltage to the low voltage load 150, an output current to the low voltage load 150, and an output power to the low voltage load 150 or a combination thereof. The battery control system includes a sensor configured to sense the output physical quantity. In one embodiment, the first current sensor in each of the slave control apparatuses 120, 130, and 140 is separate from the sensor configured to sense the physical quantities including the output voltage and the output power. However, in an alternative embodiment, a single sensor may be used to sense all of the output physical quantities.

In one embodiment, the battery control system includes a second current sensor configured to sense an output current $I_L$ of the converter. The slave control apparatus 120 receives output current data, based on the output current $I_L$, of the converter from the second current sensor. In one embodiment, the second current sensor is included in the slave control apparatus 120. In another embodiment, the second current sensor is external and operatively connected to the slave control apparatus 120 and the low voltage load 150, while being part of the battery control system.

In an example, the converter includes a direct current-to-direct current (DC-DC) converter. For example, the converter includes a boost converter.

The slave control apparatus 120 determines state information of the battery 121 based on the physical quantity of the battery 121 and the output physical quantity of the converter. The state information of the battery 121 includes, for example, one of a state of charge (SOC), a state of health (SOH), and a capacity of the battery 121 or a combination thereof.

A sensing point in time of the physical quantity corresponds to a sensing point in time of the output physical quantity. The physical quantity and the output physical quantity are processed to determine the state information of the battery 121. The slave control apparatus 120 determines the state information of the battery 121 based on a current from the battery 121 and an output current from the converter in the slave control apparatus 120, where the current and the output current are sensed at the same point in time. In the above example, a current $I_{H1}$ or $I_{H2}$ sensed at $t_a$ and an output current $I_L$ sensed at $t_a$ are used to determine the state information of the battery 121. Further, the slave control apparatus 120 determines the state information of the battery 121 based on a voltage and a temperature of the battery 121, where the voltage and the temperature are sensed at $t_a$. Because the physical quantity and the output physical quantity sensed at the same point in time are used to determine the state information of the battery 121, the state information of the battery 121 during a sensing period is accurately determined.

In response to the state information of the battery 121 being determined, the slave control apparatus 120 transmits the state information of the battery 121 to the master control apparatus 110. In an example, the slave control apparatus 120 transmits the state information of the battery 121 to the master control apparatus 110 through controller area network (CAN) communication, 1-wired communication, or 2-wired communication. The aforementioned communication schemes are provided as examples and, thus, embodiments are not limited thereto.

The master control apparatus 110 receives state information of a corresponding battery from each of the plurality of slave control apparatuses 120, 130, and 140. In detail, the master control apparatus 110 receives the state information of the battery 121 from the slave control apparatus 120, receives state information of the battery 131 from the slave control apparatus 130, and receives state information of the battery 141 from the slave control apparatus 140.

The master control apparatus 110 determines pack state information of the battery pack, which includes the plurality of batteries 121, 131, and 141, based on the state information of the plurality of batteries 121, 131, and 141. For example, the master control apparatus 110 receives an SOC of each of the plurality of batteries 121, 131, and 141 from a corresponding slave control apparatus 120, 130, and 140, and calculates an average SOC. The master control apparatus 110 determines the average SOC to be the pack state information. In another example, the master control apparatus 110 receives the SOC and an SOH of each of the plurality of batteries 121, 131, and 141 from a corresponding slave control apparatus 120, 130, and 140, and calculates the average SOC and an average SOH. In this example, the master control apparatus 110 determines a product of the average SOC and the average SOH to be the pack state information. Because each of the plurality of slave control apparatuses 120, 130, and 140 determines state information of a corresponding battery 121, 131, and 141, the master control apparatus 110 does not need to calculate the state information of each of the plurality of batteries 121, 131, and 141. Hence, a computational complexity of the master control apparatus 110 decreases.

In an example, the master control apparatus 110 transmits the pack state information to an electronic control unit (ECU). The ECU outputs the pack state information through a display of a dashboard.

The master control apparatus 110 determines output information of each of the plurality of converters. For example, the master control apparatus 110 determines output information of each of the plurality of converters to correspond to the state information of each of the plurality of batteries 121, 131, and 141. The output information of each of the plurality of converters includes, for example, one of voltage information, current information, and power information or a combination thereof.

The output information of each of the plurality of converters is determined separately and/or differently. In on example, the master control apparatus 110 determines the output information of each of the plurality of converters based on a required physical quantity of the low voltage load 150 and a ratio of the state information of each of the plurality of batteries 121, 131, and 141 to a sum of the respective state information of the plurality of batteries 121, 131, and 141.

For example, in a case in which the SOC of the battery 121 corresponds to "0.75", the SOC of the battery 131 corresponds to "1", and the SOC of the battery 141 corresponds to "0.5", a sum of the SOCs of the plurality of batteries 121, 131, and 141 corresponds to "2.25". A ratio of the SOC of the battery 121 to the sum of the SOCs corresponds to "1/3", a ratio of the SOC of the battery 131 to the sum of the SOCs corresponds to "4/9", and a ratio of the SOC of the battery 141 to the sum of the SOCs corresponds to "2/9". In this example, in a case in which a required physical quantity of a load corresponds to 90 watts (W), the output information of the converter corresponding to the battery 121 is determined by 90×(1/3) W. The master control apparatus 110 determines the output information for the converter corresponding to the battery 121 to output 30 W. Similarly, the output information of the converter corresponding to the battery 131 is determined by 90×(4/9) W, and the master control apparatus 110 determines the output information for the converter corresponding to the battery 131 to output 40 W. The output information of the converter corresponding to the battery 141 is determined by 90*(2/9) W, and the master control apparatus 110 determines the output information for the converter corresponding to the battery 141 to output 20 W.

The master control apparatus 110 transmits the output information of the plurality of converters to the plurality of slave control apparatuses 120, 130, and 140, respectively.

The converter operates based on the output information. Thus, the converter converts an electrical physical quantity of the battery 121 to correspond to the output information. In the example provided above, the converter converts high-voltage power stored in the battery 121 to low-voltage power of 30 W. The converter corresponding to the battery 121 outputs 30 W to the low voltage load 150. Similarly, the converter corresponding to the battery 131 outputs 40 W to the low voltage load 150. The converter corresponding to the battery 141 outputs 20 W to the low voltage load 150. A battery with a relatively high SOC supplies a relatively large physical quantity to the low voltage load 150, and a battery with a relatively low SOC supplies a relatively small physical quantity to the low voltage load 150. As a result, state information among the plurality of batteries 121, 131, and 141 is balanced.

A temperature of each of the plurality of batteries 121, 131, and 141 differs depending on a position of each of the plurality of batteries 121, 131, and 141. Temperature differences among the plurality of batteries 121, 131, and 141 influence the life or performance of the battery pack. In an example, the respective temperatures of the plurality of batteries 121, 131, and 141 are controlled separately. For example, the slave control apparatus 120 controls the temperature of the battery 121 based on a sensed or measured physical quantity of the battery 121. In a case in which the temperature of the battery 121 is higher than a reference temperature, the slave control apparatus 120 cools the battery 121. Conversely, in a case in which the temperature of the battery 121 is lower than the reference temperature, the slave control apparatus 120 heats the battery 121. By controlling the temperatures in a battery cell or battery module unit, the temperature control performance improves. Further, by controlling the temperature differences among the plurality of batteries 121, 131, and 141, the life of the battery pack increases.

In an example, each of the plurality of slave control apparatuses 120, 130, and 140 senses a leakage current of a corresponding battery based on a variance in a resistance of an insulation resistor corresponding to the corresponding battery 121, 131, and 141. By sensing a leakage current in a battery cell or battery module unit, rather than a battery pack unit, the accuracy of sensing a leakage current increases and the safety of battery usage improves. An example of sensing a leakage current will be described with reference to FIGS. 4A and 4B.

Figure 2:
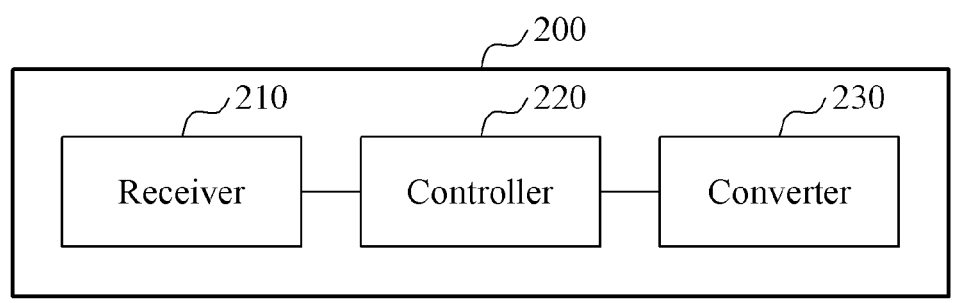
FIG. 2 is a block diagram illustrating an example of a slave control apparatus, in accordance with an embodiment.

FIG. 2 is a block diagram illustrating an example of a slave control apparatus, in accordance with an embodiment. In one embodiment, the slave control apparatus corresponds to one or all of the slave control apparatuses 120, 130, and 140 illustrated in FIG. 1.

Referring to FIG. 2, a slave control apparatus 200 includes a receiver or an obtaining processor 210, a controller 220, and a converter 230.

The receiver 210 receives a sensed physical quantity of a battery, and a sensed output physical quantity of the converter 230. In a case in which a first current sensor senses a discharging current or a charging current of the battery, the receiver 210 receives current data of the battery from the first current sensor. In this example, the first current sensor is external and operatively connected to the slave control apparatus 200. However, a person skilled in the art will appreciate that the first current sensor may be part of the slave control apparatus 200. In a case in which a voltage sensor senses a voltage of the battery, the receiver 210 receives voltage data of the battery from the voltage sensor. In this example, the voltage sensor is external and operatively connected to the slave control apparatus 200. However, a person skilled in the art will appreciate that the voltage sensor may be part of the slave control apparatus 200. In a case in which a temperature sensor senses a temperature of the battery, the receiver 210 receives temperature data of the battery from the temperature sensor. In this example, the temperature sensor is external and operatively connected to the slave control apparatus 200. However, a person skilled in the art will appreciate that the temperature sensor may be part of the slave control apparatus 200.

A second current sensor physically distinct from the first current sensor senses an output current of the converter 230. In a case in which the second current sensor senses the output current of the converter 230, the receiver 210 receives output current data of the converter 230 from the second current sensor.

The controller 220 determines state information of the battery based on the sensed physical quantity of the battery and the sensed output physical quantity of the converter 230. The controller 220 transmits the state information of the battery to a master control apparatus.

The master control apparatus receives state information of a plurality of batteries from a plurality of slave control apparatuses. The master control apparatus determines pack state information of a battery pack, including the plurality of batteries, based on the state information of the plurality of batteries.

The master control apparatus determines output information corresponding to the state information transmitted from the slave control apparatus 200. In an embodiment, the output information is determined based on a required amount of power by a low voltage load. A physical quantity to be output from the converter 230 to the low voltage load is determined by the master control apparatus. The master control apparatus transmits the output information to the slave control apparatus 200.

The controller 220 controls the converter 230 based on the output information. The converter 230 converts an electrical physical quantity of the battery to correspond to the output information. For example, the converter 230 steps down a voltage of the battery to correspond to the output information. In other words, the converter 230 converts high-voltage power stored in the battery to correspond to the output information. In doing so, the converter 230 outputs a physical quantity suitable for an operating voltage of the low voltage load, for example, 12 $V_{DC}$.

The descriptions provided with reference to FIG. 1 are applicable to the matters described with reference to FIG. 2, and thus duplicated descriptions will be omitted for conciseness.

Figure 3A:
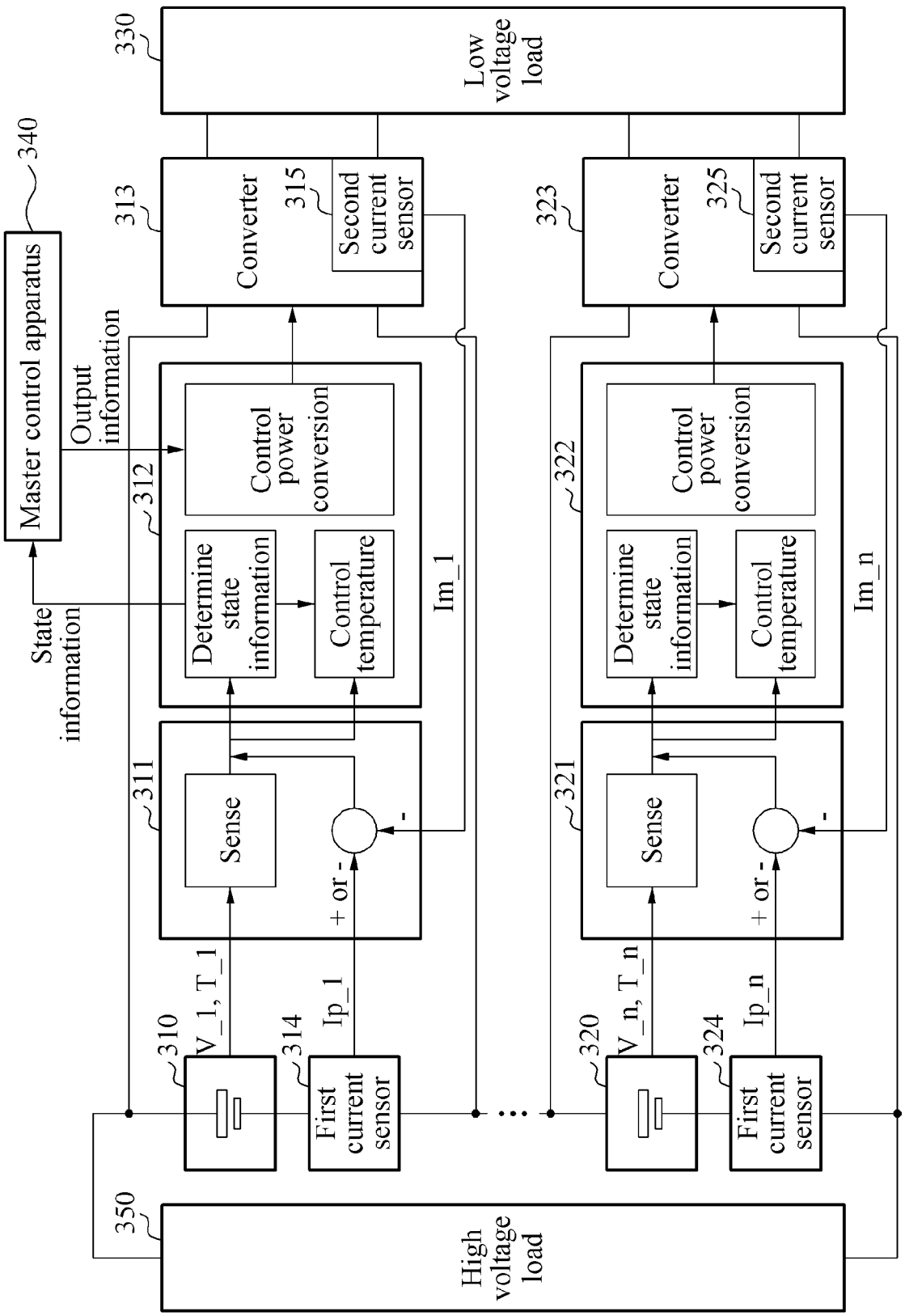

FIGS. 3A and 3B illustrate an example of an operation of a slave control apparatus, for example, the slave control apparatus 120 of FIG. 1, in accordance with an embodiment.

Referring to FIG. 3A, a slave control apparatus includes a receiver or an obtaining processor 311, a controller 312, and a converter 313.

The receiver 311 receives a first current value $I_{p\_}1$ from a first current sensor 314. Further, the receiver 311 receives a second current value $I_{m\_}1$ from a second current sensor 315.

The receiver 311 receives and converts $I_{p\_}1$ to $-I_{p\_}1$ or $+I_{p\_}1$. For instance, a plurality of batteries 310 and 320 being connected in series supplies currents to a high voltage load 350 without power-conversion or voltage-conversion, and the first current sensor 314 senses the currents supplied to the high voltage load 350. In this example, the battery 310 is discharged, and the receiver 311 defines $I_{p\_}1$ as $-I_{p\_}1$. Also, the battery 310 is charged, by a charger, as a current flows into the battery 310. The first current sensor 314 senses the current flowing into the battery 310 and the receiver 311 defines $I_{p\_}1$ as $+I_{p\_}1$.

A receiver or obtaining processor 321 included in another slave control apparatus receives $I_{p\_}n$ from a first current sensor 324, and defines $I_{p\_}n$ as $-I_{p\_}n$ or $+I_{p\_}n$.

The receiver 311 receives and converts $I_{m\_}1$ to $-I_{m\_}1$. The second current sensor 315 senses a current output to a low voltage load 330. In this example, the battery 310 is discharged. Similarly, the receiver 321 receives $I_{m\_}n$ from a second current sensor 325, and receives and converts $I_{m\_}n$ to $-I_{m\_}n$.

The receiver 311 performs a calculation using $I_{p\_}1$ and $I_{m\_}1$. The receiver 311 obtains $-I_{p\_}1-I_{m\_}1$ or $+I_{p\_}1-I_{m\_}1$ by performing calculation using $I_{p\_}1$ and $I_{m\_}1$. In doing so, an amount of currents output from or flowing into the battery 310 during a sensing period is verified accurately. Similarly, the receiver 321 obtains $-I_{p\_}n-I_{m\_}n$ or $+I_{p\_}n-I_{m\_}n$ by performing calculation using $I_{p\_}n$ and $I_{m\_}n$.

In an example, the receiver 311 receives a voltage value $V\_1$ of the battery 310 from a voltage sensor. Further, the receiver 311 receives a temperature value $T\_1$ of the battery 310 from a temperature sensor.

Similarly, the receiver 321 receives $V\_n$ and/or $T\_n$.

In an example, the physical quantity of the battery 310 and the output physical quantity of the converter 313, the physical quantity and the output physical quantity to be used to determine state information of the battery 310, are sensed or detected at a synchronized sensing point in time. In other words, a sensing point in time of the physical quantity of the battery 310 is the same as a sensing point in time of the output physical quantity of the converter 313. Hereinafter, descriptions will be provided with reference to FIG. 3B.

Referring to FIG. 3B, sensing points in time are illustrated.

Each of the first current sensor 314 and the second current sensor 315 senses or measures a target physical quantity at $t_1$. In an embodiment, the target physical quantity includes a current of the battery 310 and an output current of the converter 313. The receiver 311 receives a first current set $\{I_{p\_}1\_1, I_{m\_}1\_1\}$ corresponding to the target physical quantity sensed or measured at $t_1$. As described above, $I_{p\_}1\_1$ is defined as $+I_{p\_}1\_1$ or $-I_{p\_}1\_1$, and $I_{m\_}1\_1$ is defined as $-I_{m\_}1\_1$.

Further, each of the first current sensor 314 and the second current sensor 315 senses a target physical quantity at $t_2$. The receiver 311 obtains a second set $\{I_{p\_}1\_2, I_{m\_}1\_2\}$ corresponding to the target physical quantity sensed at $t_2$. Similarly, the receiver 311 receives an a-th current set $\{I_{p\_}1\_a, I_{m\_}1\_a\}$ corresponding to a target physical quantity sensed at $t_a$.

Each of the sets further includes a target physical quantity sensed by the voltage sensor and/or the temperature sensor. For example, a first set corresponding to the target physical quantity measured at $t_1$ is $(I_{p\_}1\_1, V\_1\_1, T\_1\_1, I_{m\_}1\_1)$. Similarly, a second set corresponding to the physical quantity sensed at $t_2$ is $\{I_p\_1\_2, V\_1\_2, T\_1\_2, I_m\_1\_2\}$, and an a-th set corresponding to the physical quantity sensed at $t_a$ is $\{I_p\_1\_a, V\_1\_a, T\_1\_a, I_m\_1\_a\}$.

The controller 312 determines state information_1 of the battery 310 based on one of the first to a-th sets or a combination thereof.

The receiver 321 operates in the same manner as the receiver 311. The receiver 321 receives a first set $\{I_p\_n\_1, V\_n\_1, T\_n\_1, I_m\_n\_1\}$ corresponding to a target physical quantity sensed at $t_1$. Further, the receiver 321 receives an a-th set $\{I_p\_n\_a, V\_n\_a, T\_n\_a, I_m\_n\_a\}$ corresponding to a target physical quantity sensed at $t_a$.

A controller 322 determines state information_n of the battery 320 based on one of the first to a-th sets or a combination thereof.

Referring to FIG. 3A again, the controller 312 transmits the state information_1 to a master control apparatus 340. The master control apparatus 340 determines output information_1 corresponding to the state information_1, and transmits the output information_1 to the controller 312. The controller 312 controls the converter 313 based on the output information_1. A physical quantity corresponding to the output information_1 is supplied to the low voltage load 330.

The controller 322 transmits the state information_n to the master control apparatus 340. The master control apparatus 340 determines output information_n corresponding to the state information_n, and transmits the output information_n to the controller 322. The controller 322 controls a converter 323 based on the output information_n. A physical quantity corresponding to the output information_n is supplied to the low voltage load 330.

The controller 312 controls a temperature of the battery 310. For example, the controller 312 verifies whether the temperature of the battery 310 is outside of a reference temperature range. In a case in which the temperature of the battery 310 is outside of the reference temperature range, the controller 312 cools or heats the battery 310. For instance, in a case in which the temperature of the battery 310 is below the reference temperature range (ex, 20° C.~40° C.), the controller 312 heats the battery 310. If, instead, the temperature of the battery 310 is above the reference temperature range, the controller 312 cools down the battery 310 to a preset temperature (ex, 25° C.). The reference temperature range and the preset temperature range may be pre-defined by a user during set-up of the controller 312. In one embodiment, the reference temperature range and the preset temperature range may be defined at a later stage of the manufacture of a slave control apparatus.

The descriptions provided with reference to FIGS. 1 and 2 are applicable to the matters described with reference to FIGS. 3A and 3B and, thus, duplicated descriptions will be omitted for conciseness.

FIGS. 4A and 4B are circuit diagrams illustrating an example of sensing a leakage current using a slave control apparatus, in accordance with an embodiment.

Referring to FIGS. 4A and 4B, insulation resistors are illustrated. In the example of FIG. 4A, insulation resistors are connected to cathodes of batteries. In the example of FIG. 4B, insulation resistors are connected to anodes of the batteries. Here, insulation resistors 412 and 422 are virtual resistors. In other words, the insulation resistors 412 and 422 are not physical elements like resistors 413 and 423.

Slave control apparatuses of FIGS. 4A and 4B operate in the same manner, and thus descriptions will be provided based on the example of FIG. 4A.

Referring to FIG. 4A, the insulation resistor 412 corresponds to a battery 411, and the insulation resistor 422 corresponds to a battery 421.

In a case in which the plurality of batteries 411 and 421 is insulated, each of the plurality of insulation resistors 412 and 422 has an inherent infinite resistance. Thus, a closed loop including the battery 411, the resistor 413, and the insulation resistor 412 is not formed, and voltages do not occur at both ends of the resistor 413. Similarly, a closed loop including the battery 421, the resistor 423, and the insulation resistor 422 is not formed, and voltages do not occur at both ends of the resistor 423.

As the plurality of batteries 411 and 421 ages, an insulation of a portion of the plurality of batteries 411 and 421 is broken down. In this example, an insulation resistor corresponding to the insulation-broken battery has a resistance, and a leakage current occurs.

A slave control apparatus 410 senses a leakage current based on a variance in a resistance of an insulation resistor. For example, a leakage current occurs in the battery 411. In this example, a closed loop including the battery 411, the resistor 413, and the insulation resistor 413 is formed, and voltages occur at both ends of the resistor 413. The voltages at both the ends of the resistor 413 are amplified by an amplifier, and a controller senses a leakage current based on an output of the amplifier. The controller verifies whether voltages exist at both ends of the resistor 413 corresponding to the controller. In response to the controller verifying that the voltages exist at both ends of the resistor 413, the controller determines that a leakage current occurs in the battery 411. The slave control apparatus 410 informs a master control apparatus of the occurrence of the leakage current. The master control apparatus informs a user of the occurrence of the leakage current through an ECU. Because a leakage current is sensed in a battery cell or battery module unit, the performance of sensing a leakage current improves and the safety of a battery pack increases.

Figure 5:
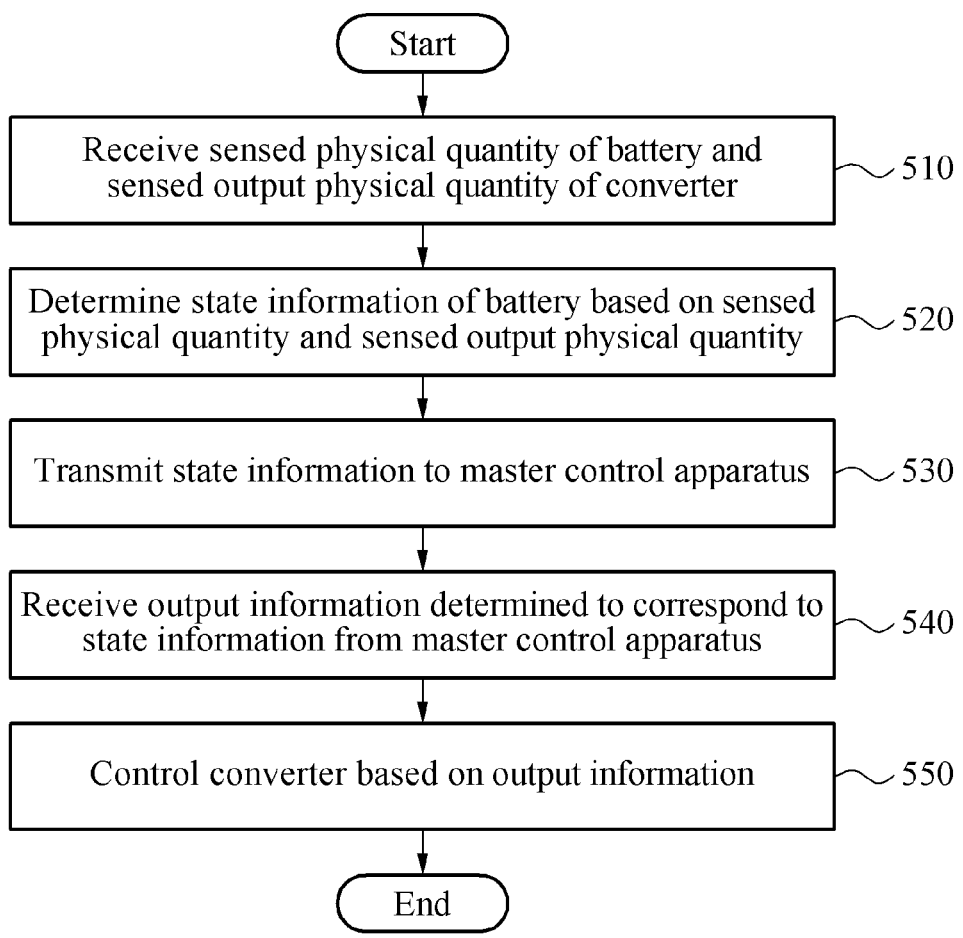
FIG. 5 is a flowchart illustrating an example of an operating method of the slave control apparatus, in accordance with an embodiment.

FIG. 5 is a flowchart illustrating an example of an operating method of the slave control apparatus, in accordance with an embodiment.

Referring to FIG. 5, in operation 510, a slave control apparatus obtains or receives a sensed physical quantity of a battery and a sensed output physical quantity of a converter.

In operation 520, the slave control apparatus determines state information of the battery based on the sensed physical quantity and the sensed output physical quantity.

In operation 530, the slave control apparatus transmits the state information to a master control apparatus.

In operation 540, the slave control apparatus receives output information, determined to correspond to the state information, from the master control apparatus.

In operation 550, the slave control apparatus controls the converter based on the output information from the master control apparatus.

The slave control apparatus includes at least the following structural or hardware elements: a plurality of sensors, a processor, and the converter. The plurality of sensors includes the first current sensor and the second current sensor described above. Further, the plurality of sensors further includes the voltage sensor and/or the temperature sensor described above. The processor performs operations 510 through 550 and, thus, duplicated descriptions will be omitted for conciseness.

The descriptions provided with reference to FIGS. 1 through 4B are applicable to the matters described with reference to FIG. 5 and, thus, duplicated descriptions will be omitted for conciseness.

Figure 6:
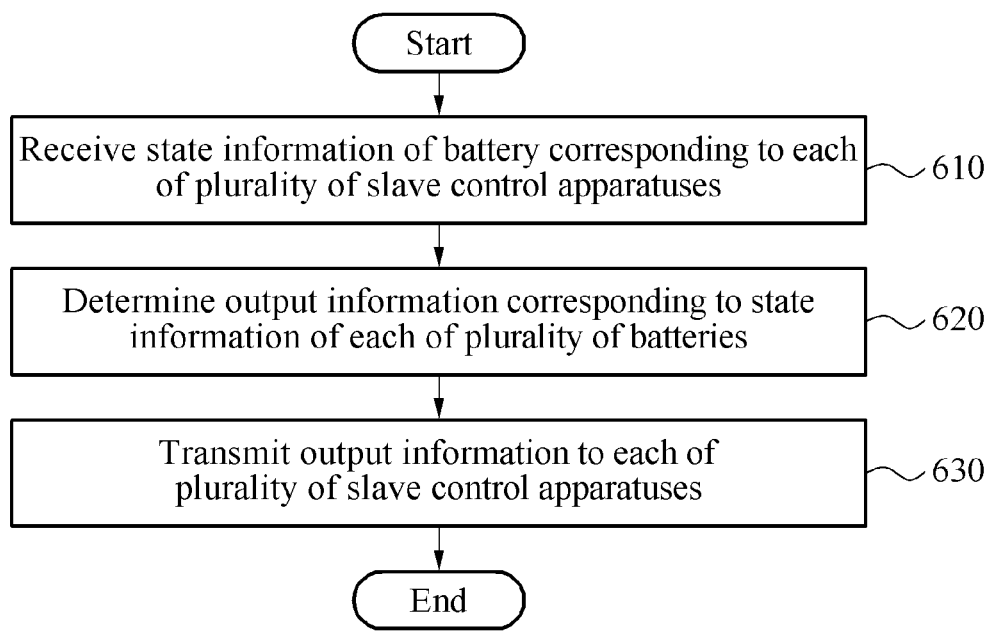
FIG. 6 is a flowchart illustrating an example of an operating method of a master control apparatus, in accordance with an embodiment.

FIG. 6 is a flowchart illustrating an example of an operating method of the master control apparatus, in accordance with an embodiment.

Referring to FIG. 6, in operation 610, a master control apparatus receives state information of a battery corresponding to each of a plurality of slave control apparatuses from each of the plurality of slave control apparatuses.

In operation 620, the master control apparatus determines output information corresponding to the state information. The master control apparatus separately determines an output physical quantity of a converter included in each of the plurality of slave control apparatuses.

In operation 630, the master control apparatus transmits the output information to each of the plurality of slave control apparatuses. Each slave control apparatus controls each converter based on output information. Thus, a battery storing a relatively large amount of power supplies a relatively or a proportional large amount of power to a low voltage load. Also, a battery storing a relatively small amount of power supplies a relatively or a proportional small amount of power to the low voltage load.

The descriptions provided with reference to FIGS. 1 through 5 are applicable to the matters described with reference to FIG. 6 and, thus, duplicated descriptions will be omitted for conciseness.

Figure 7:
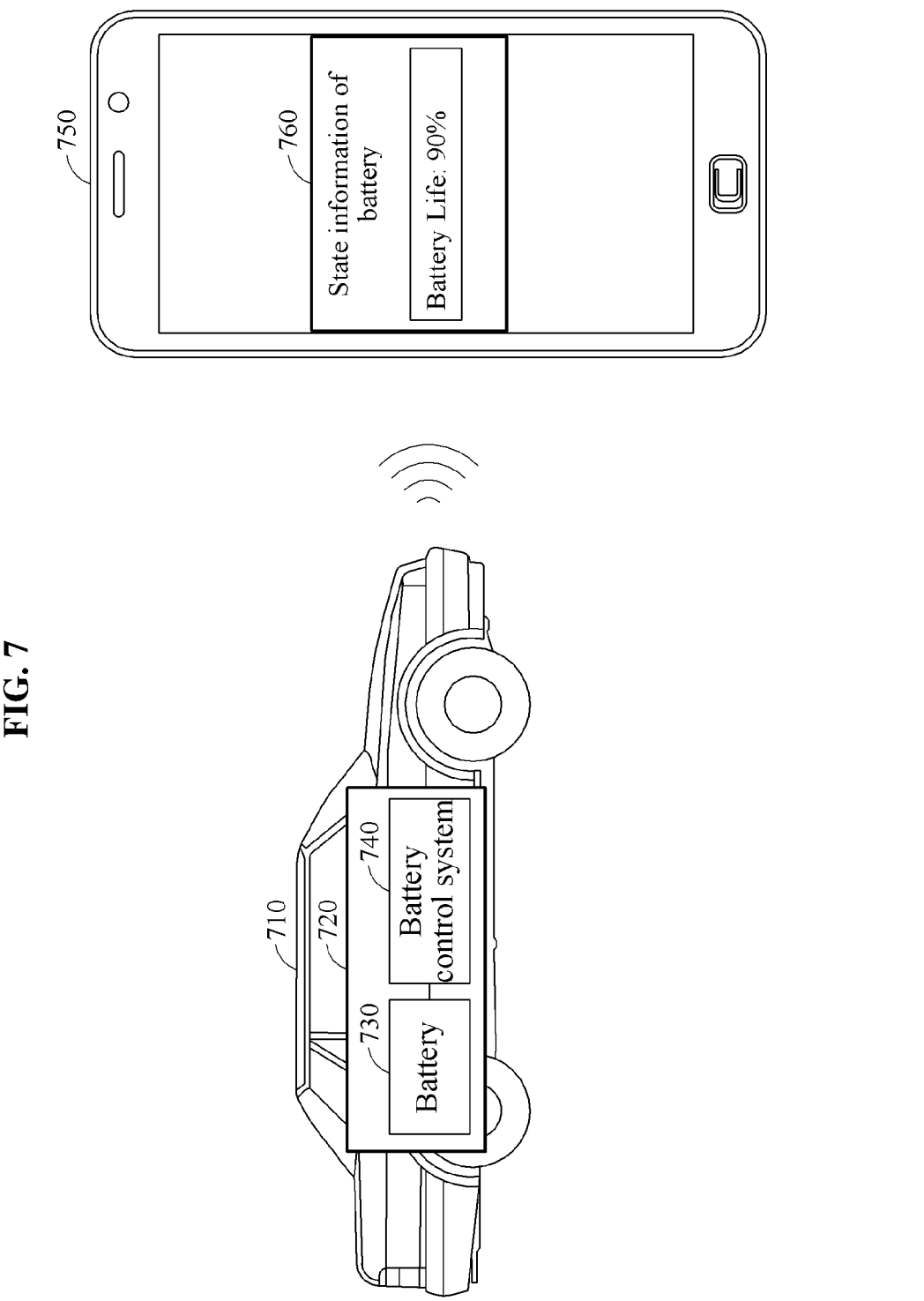
FIG. 7 illustrates an example of providing state information of a battery, in accordance with an embodiment.

FIG. 7 illustrates an example of providing state information of the battery, in accordance with an embodiment.

Referring to FIG. 7, a physical electrical moving body, such as a vehicle 710, includes a battery system 720. The physical body is provided exemplarily, and thus examples are not limited thereto. A battery system is applicable to all physical structural applications using batteries, in addition to an electrical moving body.

The battery system 720 includes a battery pack 730 and a battery control system 740. The battery pack 730 includes a plurality of batteries. The battery control system 740 includes the master control apparatus and the plurality of slave control apparatuses, as described above.

As charge/discharge cycles of the battery pack 730 including the plurality of batteries having different performances, for example, different voltages and/or different capacities, repeat, over-charging and over-discharging occur. In response to the over-charging and the over-discharging, a performance of the plurality of batteries degrades and the life of the battery pack 730 decreases.

The battery control system 740 controls the plurality of batteries to operate in an optimal state based on information related to a voltage, a current, and/or a temperature of each of the plurality of batteries. For example, the battery control system 740 controls each of the plurality of batteries to operate at an optimal temperature, or maintains state information of each of the plurality of batteries at a proper level.

Further, the battery control system 740 generates information for safe operation of the battery system 720, and transmits the information for safe operation to a terminal 750. For example, the battery control system 740 transmits to the terminal 750, performance information of each of the plurality of batteries and/or a time to replace the battery pack 730.

The battery control system 740 determines state information of each of the plurality of batteries based on a trigger signal received from the terminal 750 through a wireless interface. For instance, a slave control apparatus determines state information of a corresponding battery, and transmits the state information to the master control apparatus. The master control apparatus determines pack state information of the battery pack 730 based on the state information of each of the plurality of batteries. The battery control system 740 transmits the pack state information to the terminal 750 through the wireless interface. The terminal 750 displays the pack state information using a user interface 760.

The descriptions provided with reference to FIGS. 1 through 6 are applicable to the matters described with reference to FIG. 7 and, thus, duplicated descriptions will be omitted for conciseness.

Figure 8:
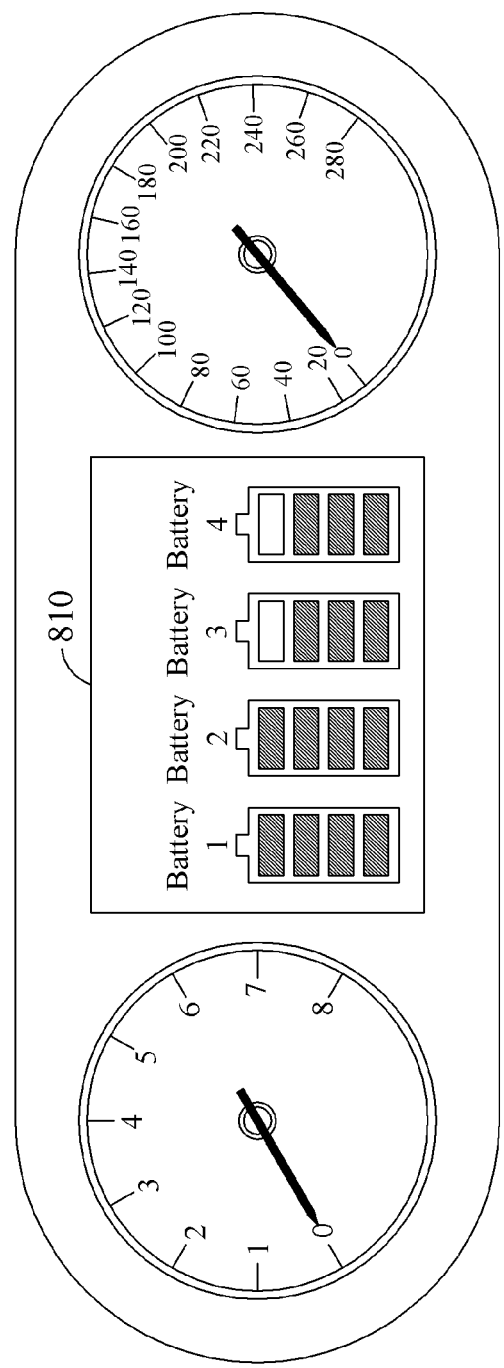
FIG. 8 illustrates another example of providing state information of batteries, in accordance with an embodiment.

FIG. 8 illustrates another example of providing state information of batteries, in accordance with an embodiment.

Referring to FIG. 8, a slave control apparatus corresponding to each of a plurality of batteries determines state information of a corresponding battery. The slave control apparatus transmits the state information of the corresponding battery to a master control apparatus, and the master control apparatus transmits state information of the plurality of batteries to an ECU.

The ECU outputs the state information of the plurality of batteries through a display 810.

The descriptions provided with reference to FIGS. 1 through 7 are applicable to the matters described with reference to FIG. 8 and, thus, duplicated descriptions will be omitted for conciseness.

The apparatuses, receivers, converters, controllers, sensors, and determiners described above are hardware devices, elements, or components. Examples of hardware devices, elements, or components include controllers, sensors, generators, drivers, and any other electronic components known to one of ordinary skill in the art. In one example, the hardware devices, elements, or components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A slave control apparatus, comprising:
a converter configured to correspond to a battery;
a receiver configured to receive a sensed physical quantity of the battery and a sensed output physical quantity of the converter; and
a controller configured to determine state information of the battery based on the sensed physical quantity and the sensed output physical quantity, transmit the state information to a master control apparatus, and control the converter based on output information from the master control apparatus that corresponds to the state information,
wherein a physical quantity of the battery and an output physical quantity of the converter are sensed at a synchronized point in time.

2. The slave control apparatus of claim 1, wherein the receiver is configured to perform calculation using a first value of a first current sensed at a first sensing point in time and a second value of a second current sensed at the first sensing point in time,
the first current corresponds to a current flowing between a high voltage load and the battery, and
the second current corresponds to an output current from the converter to a low voltage load.

3. The slave control apparatus of claim 2, wherein the controller is configured to determine the state information based on at least one of a result of the performing of the calculation, a sensed thermal physical quantity of the battery, and a sensed electrical physical quantity of the battery.

4. The slave control apparatus of claim 1, wherein the output information is based on a required physical quantity of a low voltage load.

5. The slave control apparatus of claim 1, wherein pack state information of a battery pack, which comprises the battery and another battery, is based on the state information of the battery and state information of the other battery.

6. The slave control apparatus of claim 1, wherein the controller is configured to control a temperature of the battery based on the sensed physical quantity of the battery.

7. The slave control apparatus of claim 1, wherein the controller is configured to sense a leakage current of the battery based on a variance in a resistance of an insulation resistor corresponding to the battery.

8. A battery control system, comprising:
slave control apparatuses corresponding to batteries, respectively; and
a master control apparatus configured to control the slave control apparatuses,
wherein each of the slave control apparatuses comprises a converter corresponding to the corresponding battery of the batteries, and is configured to:
receive a sensed physical quantity of the corresponding battery and a sensed output physical quantity of the converter corresponding to the corresponding battery;
determine state information of the corresponding battery based on the sensed physical quantity and the sensed output physical quantity;
transmit the state information to the master control apparatus; and
control the converter based on output information from the master control apparatus that corresponds to the state information,
wherein a physical quantity of the corresponding battery and an output physical quantity of the converter corresponding to the corresponding battery are sensed at a synchronized point in time.

9. The battery control system of claim 8, wherein each of the slave control apparatuses is configured to perform calculation using a first value of a first current sensed at a first sensing point in time and a second value of a second current sensed at the first sensing point in time, the first current corresponds to a current flowing between a high voltage load and the corresponding battery, and the second current corresponds to an output current from the converter to a low voltage load.

10. The battery control system of claim 9, wherein each of the slave control apparatuses is configured to determine the state information based on at least one of the performing of the calculation, a sensed thermal physical quantity of the corresponding battery, and a sensed electrical physical quantity of the corresponding battery.

11. The battery control system of claim 8, wherein the master control apparatus is configured to determine the output information to correspond to the state information based on a required physical quantity of a low voltage load.

12. The battery control system of claim 8, wherein the master control apparatus is configured to determine pack state information of a battery pack comprising the batteries based on the state information of the corresponding battery transmitted by each of the slave control apparatuses.

13. The battery control system of claim 8, wherein each of the slave control apparatuses is configured to control a temperature of the corresponding battery based on the sensed physical quantity of the corresponding battery.

14. The battery control system of claim 8, wherein each of the slave control apparatuses is configured to sense a leakage current of the corresponding battery based on a variance in a resistance of an insulation resistor of the corresponding battery.

15. An operating method of a slave control apparatus, the method comprising:

receiving a sensed physical quantity of a battery and a sensed output physical quantity of a converter, the converter being included in the slave control apparatus;

determining state information of the battery based on the sensed physical quantity and the sensed output physical quantity;

transmitting the state information to a master control apparatus;

receiving output information corresponding to the state information from the master control apparatus; and controlling the converter based on the output information, wherein a physical quantity of the battery and an output physical quantity of the converter are sensed at a synchronized point in time.

16. The method of claim 15, wherein the receiving comprises performing calculation using a first value of a first current sensed at a first sensing point in time and a second value of a second current sensed at the first sensing point in time, the first current corresponds to a current flowing between a high voltage load and the battery, and the second current corresponds to an output current of the converter, the current output to a low voltage load.

17. The method of claim 16, wherein the determining comprises determining the state information based on at least one of a result of performing the calculation, a sensed thermal physical quantity of the battery, and a sensed electrical physical quantity of the battery.

18. A slave control apparatus, comprising:

a converter configured to correspond to a battery;

a sensor configured to sense a physical quantity of the battery;

a receiver configured to receive the physical quantity of the battery and an output physical quantity of the converter; and a controller configured to determine state information of the battery based on the physical quantity of the battery and the output physical quantity of the converter, wherein the physical quantity of the battery and the output physical quantity of the converter are sensed at a synchronized point in time.

19. The slave control apparatus of claim 18, wherein the state information of the battery comprises at least one of a state of charge (SOC), a state of health (SOH), and a capacity of the battery.

20. The slave control apparatus of claim 18, wherein, in response to the state information of the battery being determined, the controller transmits the state information of the battery to a master control apparatus.

21. The slave control apparatus of claim 18, wherein the controller is further configured to control the temperature of the battery based on the physical quantity of the battery, where, in response to the temperature of the battery being higher than a reference temperature, the controller cools the battery and, in response to the temperature of the battery being lower than the reference temperature, the controller heats the battery.

* * * * *